United States Patent [19]

Schmidt

[11] Patent Number: 4,860,665
[45] Date of Patent: Aug. 29, 1989

[54] METHOD FOR PRODUCING A BELLOWS STRUCTURE

[75] Inventor: Helmbrecht Schmidt, Niestetal-Sandershausen, Fed. Rep. of Germany

[73] Assignee: Hubner Gummi- und Kunststoff GmbH, Fed. Rep. of Germany

[21] Appl. No.: 169,415

[22] Filed: Mar. 17, 1988

[30] Foreign Application Priority Data

Apr. 2, 1987 [DE] Fed. Rep. of Germany ....... 3711032

[51] Int. Cl.$^4$ .......................... B60D 5/00; B05D 3/06
[52] U.S. Cl. ....................................... 105/18; 427/36; 427/43.1; 427/44; 280/403
[58] Field of Search ................... 105/8.1, 15, 18; 427/36, 43.1, 44, 282; 160/23.1, 27, 330; 280/403

[56] References Cited

U.S. PATENT DOCUMENTS

| 2,991,509 | 7/1961 | Brophy, Jr. | 105/15 X |
| 3,387,568 | 6/1968 | Hawes | 105/18 X |
| 4,112,207 | 9/1978 | Jones | 427/44 X |
| 4,391,537 | 7/1983 | Prest, Jr. et al. | 427/44 X |
| 4,391,844 | 7/1983 | Baczek et al. | 427/44 |
| 4,677,014 | 6/1987 | Bechen | 427/44 X |

FOREIGN PATENT DOCUMENTS

| 0206910 | 12/1986 | European Pat. Off. | 105/8.1 |
| 1580974 | 3/1971 | Fed. Rep. of Germany | 105/18 |
| 3613729 | 10/1987 | Fed. Rep. of Germany | 105/18 |

*Primary Examiner*—Robert B. Reeves
*Assistant Examiner*—Dean J. Kramer
*Attorney, Agent, or Firm*—Scully, Scott, Murphy & Presser

[57] ABSTRACT

The invention relates to a bellows structure for the connection of two segments of an articulated vehicle. In order to perform their different functions the different parts of the bellows structure are submitted to differing degrees of irradiation in order to modify the cross-linking of polymer therein.

5 Claims, 1 Drawing Sheet

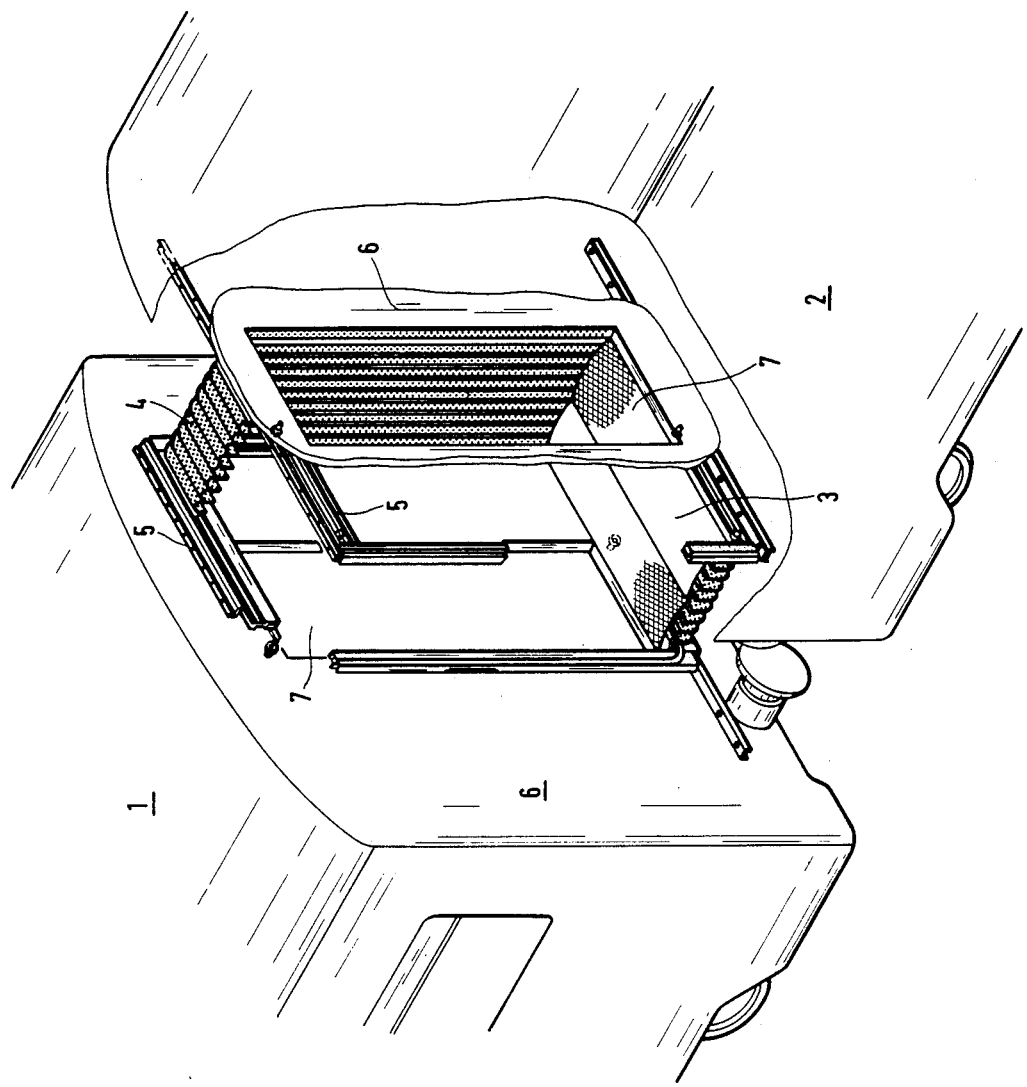

METHOD FOR PRODUCING A BELLOWS STRUCTURE

BACKGROUND OF THE INVENTION

Bellows adapted to serve as transitions or flexible passages between articulating vehicle segments (such as rail-borne or road vehicles) are generally made of a polymer which is reinforced by inlaid webs of fabric. This material may also be spoken of as a structure consisting of a fabric web coated on both sides with a natural or more especially synthetic rubber or polymer. Such a web of material formed as a bellows is inherently soft or deformable but is not elastically deformable; the relative deformability of the bellows required owing to the motion of the vehicle only results from the deformation of the web of material into a bellows. Generally, it is not only a single material web which is formed into a bellows and it is more usual for a number of strips of such material webs to be connected together along their longitudinal edges so as to form a concertina-like bellows. The connection is for instance by sewing or bonding and/or by encircling clamped-on sections.

Generally bellows have the same outer profile in the circumferential direction and apart from the corners have generally the same depth of fold, although the requirements as regards softness or the ability to yield are quite different. In fact, the side walls of the bellows should be so stiff in the vertical direction that the bellows keeps its height while the ceiling of the bellows and the floor, if any, are to be able to relatively soft in the horizontal planes in order not to overly impede the necessary relative lateral shift of vehicle segments.

In order to at least partly take this circumstance at least partly into account there has already been proposal to have a triple or multiple folding of the bellows in the transitions between lateral bellows walls and the ceiling of the bellows so that each fold is again folded into itself, because without such a measure the transitional arches would cause the bellows to be particularly stiffened in the transverse direction. This feature is however relatively expensive to implement and its accordingly seldom to be found and there are no other measures designed to allow for the different requirements in different parts of the bellows which have been put into practice because of the complexity and expense involved.

On the other hand it has recently become possible to influence the softness of a web of material of polymer compounds by causing energy to act on the web, more particularly by irradiating it with electron or x-ray beams (see the German unexamined specification 3,629,701). By having a suitable intensity of radiation it is possible for a relatively hard polymer to be softened while with another intensity a relatively soft polymer may be rendered harder by increasing or decreasing the number of inter-molecular bonds.

SHORT SUMMARY OF THE INVENTION

The invention has as one object the use of both these techniques, that is to say the manufacture of bellows as conventionally practiced and the treatment of polymers by the supply of energy thereto in order to change the number of inter-molecular bonds (thus opening up the possibility of utilizing stretch fabrics) with the possibility of systematically so applying the energy, and more especially varying the rate of irradiation so that with a relatively small amount of complexity it is possible to so treat a bellows made up of polymer-coated fabric that the individual parts of the bellows have just that stiffness or softness which is appropriate for such areas of the bellows in view of the desired degree of deformability.

Thus it is possible to so irradiate the side walls that the polymer layer surrounding the fabric is stiffened by increasing the number of molecular bonds. As a result it is possible for the side walls of the bellows to endow the bellows with a stiffness in the vertical direction which is better than without irradiation, such stiffness being needed to keep the bellows upright. This property involving stiffened material strips in the side wall areas may for instance be adopted to such an extent that the bellows does not collapse even if it does not have a frame. On the other hand the coating in the ceiling and floor part of the bellows may be softened by reducing the molecular bonds so such a degree that the deformability of the fabric is not necessarily obstructed by the presence of the coating.

On the other hand it is possible to achieve a differential degree of softness within a wall of the bellows.

While in the case of conventional bellows the deformability of a wall is due to the fact that stretch between the stiff gripping sections results from structural deformation, that is to say opening of the folds, in the case of a bellows in accordance with the invention the gripping or clamped-on section may be dispensed with because of the stiffening of the material by the action of radiation, which partially hardens the polymer material in the gripping section zone.

On the other hand bellows have been proposed with relatively stiff webs of material or in some cases may even have metallic strips, and are connected together along their longitudinal edges by hinges. The properties of the metallic strips and of the hinges may be imitated in the bellows of the present invention by differential irradiation of the webs of fabric coated with the polymer material in the hinge areas and the material web by suitable irradiation of only one area so that the coated fabric web is softened at the hinge or is stiffened in the web area.

While in the past it has been assumed that a fabric inlay with a constant property is to be used in the entire bellows, in accordance with a further feature of the present invention it is possible to obtain the desired property by the use of different fabric inlays. In the part with relatively soft polymers it is possible to utilize a fabric inlay which is inherently elastically deformable in order to be able to fully benefit from the relatively high degree of softness of the polymer in this area, while in the parts with a relative stiff polymer a nonelastic fabric inlay will be used in order to cause the relatively small degree of softness of the polymer coating to have its counterpart in the fabric inlay. This design is more especially suitable for the transition arches, in which the coating is so irradiated that it is relatively extremely soft and yielding and this softness of the coating find its counterpart in a suitably soft fabric.

This can lead to a bellows which in every part thereof has the material deformability required for optimum design and in which this effect is achieved simply by having recourse to differential irradiation, possibly in combination with differential elastic deformation of the fabric inlay. The side walls are relatively stiff in the vertical direction. The ceiling and the floor, if any, are so treated that lateral offset of the vehicle is substantially not obstructed at all. The connecting arches are rendered so soft—by irradiation and possibly by the use of an elastically soft fabric inlay—that they do not cause any stiffening action. The ceiling and the floor should naturally not sag.

The supply of energy to the bellows may involve the use of a mask which covers over certain parts of the bellows and prevents the access of energy to such areas which are not to be affected, such masks having openings in those areas in which energy is to have access to the bellows. Thus, a mask is disposed over the bellows to leave open the reversal parts of the folds thereof. This allows crosslinking of the reversal parts of the folds. Similarly, the strips on both sides of the reversal parts of the folds of the bellows are also subjected to crosslinkage by means of masking wherein the strips are exposed, through the mask, to crosslinkage by means of electron beam irradiation and X-rays. In addition, this expedient is utilized to modify the degree of crosslinkage of the ceiling and floor parts of the bellows structure. Finally, the masking technique is utilized to expose the side walls of the bellows to increase the degree of crosslinkage thereof.

This technique makes it possible to use a single material, which is inherently extensible, while however in the areas which are to be additionally stiffened by radiation (or for instance by chemical methods) make stretch of the coated extensible fabric less possible or not possible at all owing to the hardness of the coating.

DETAILED ACCOUNT OF WORKING EXAMPLE OF THE INVENTION

The FIGURE shows a connecting or transition device between two railroad carriages diagrammatically, use being made of a bellows in accordance with the invention. The two railroad carriages 1 and 2 are conventionally articulated with each other by a joint which is not shown. Between the two railroad carriages 1 and 2 there is a bridge 3 over which persons may make their way from one railroad carriage to the other. In order to provide protection of such persons against the air through which the train is moving, dust, rain and snow the bridge 3 is covered over by a tunnel which is in the form of a bellows 4. The bellows 4 is attached at its two ends to each of the two railroad carriages. This attachment may be by way of gripping devices 5 on the railroad carriages 1 and 2. In the end wall 6 of each railroad carriage there is an opening adjacent to which there is the bridge 3 and the bellows 4.

I claim:

1. A method for producing a bellows structure for the connection of segments of an articulated vehicle in which a mask is placed adjacent to material of such bellows structure having a fabric coated with a polymer, and irradiation of such polymer through at least one opening in such mask is performed in order to modify cross-linking of such polymer.

2. A method in accordance with claim 1 wherein said irradiation of said polymer through said mask is applied to crosslink reversal parts of folds provided on said bellows structure.

3. A method in accordance with claim 1 wherein said mask is utilized to modify the degree of crosslinkage of polymeric strips provided on both sides of reversal parts of folds disposed on said bellows structure.

4. A method in accordance with claim 1 wherein said mask is utilized to modify the degree of crosslinkage of polymer constituting ceiling and floor parts of said bellows structure.

5. A method in accordance with claim 1 wherein said mask is applied to increase the degree of crosslinkage of polymer constituting side walls of said bellows structure.

* * * * *